United States Patent
Sekiguchi et al.

(10) Patent No.: US 6,232,387 B1
(45) Date of Patent: May 15, 2001

(54) SILICONE RUBBER COMPOSITIONS FOR HIGH-VOLTAGE ELECTRICAL INSULATORS

(75) Inventors: Susumu Sekiguchi; Noriyuki Meguriya; Syuuichi Azechi; Takeo Yoshida, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/312,696

(22) Filed: May 17, 1999

(30) Foreign Application Priority Data

May 19, 1998 (JP) .................................................. 10-153740

(51) Int. Cl.$^7$ ............................... C08K 3/20; C08L 83/04
(52) U.S. Cl. ........................ 524/437; 524/262; 524/264; 524/265; 524/266; 524/493; 524/588; 523/203; 523/209; 523/212
(58) Field of Search ..................................... 524/437, 262, 524/264, 265, 266, 493, 588; 523/203, 201, 212

(56) References Cited

U.S. PATENT DOCUMENTS

| | | |
|---|---|---|
| 3,511,698 | 5/1970 | Talcott et al. . |
| 3,965,065 | 6/1976 | Elliott . |
| 4,476,155 | 10/1984 | Niemi . |
| 5,369,161 | 11/1994 | Kunieda et al. . |
| 5,668,205 * | 9/1997 | Yoshida et al. ........................ 524/268 |
| 5,691,407 * | 11/1997 | Azechi et al. ......................... 524/437 |
| 5,824,729 * | 10/1998 | Matsushita et al. .................. 524/437 |
| 5,883,171 * | 3/1999 | Matsushita et al. .................. 524/425 |
| 5,973,030 * | 10/1999 | Matsushita et al. .................. 523/203 |
| 5,977,216 * | 11/1999 | Merguriya et al. ................... 523/437 |
| 6,043,309 * | 3/2000 | Nakamura et al. ................... 524/500 |
| 6,063,487 * | 5/2000 | Azechi et al. ......................... 428/325 |
| 6,090,879 * | 7/2000 | Takuman et al. ..................... 524/437 |

FOREIGN PATENT DOCUMENTS

0787772 A2   6/1997   (EP) .
0801111 A1  10/1997   (EP) .

* cited by examiner

Primary Examiner—Robert Dawson
Assistant Examiner—Jeffrey B. Robertson

(57) ABSTRACT

A mixture of a first aluminum hydroxide surface treated with a silicon-containing compound and having a mean particle size of 5–20 $\mu$m and a second aluminum hydroxide surface treated with a silicon-containing compound and having a mean particle size of 0.1–2.5 $\mu$m is blended in a silicone rubber composition comprising an organopolysiloxane, finely divided silica, and an organic peroxide. The silicone rubber composition cures into silicone rubber having sufficiently improved properties to serve as high-voltage electrical insulators, even when exposed to air polluted conditions or rigorous weather conditions.

11 Claims, No Drawings

SILICONE RUBBER COMPOSITIONS FOR HIGH-VOLTAGE ELECTRICAL INSULATORS

This invention relates to a silicone rubber composition which on heat curing provides silicone rubber having sufficiently improved properties to serve as high-voltage electrical insulators.

BACKGROUND OF THE INVENTION

In general, high-voltage electrical insulating materials for use as insulators and bushings for power transmission lines are of porcelain (ceramics) or glass. In a polluted environment as in seaside areas and industrial areas, there is a tendency that dust, salts and mist attach to the surface of high-voltage electrical insulators, causing leakage currents and dry band discharge leading to flashover failure.

In order to eliminate the drawbacks of porcelain and glass insulators, a number of proposals have been made. For example, U.S. Pat. No. 3,511,698 discloses a weathering resistant high-voltage electrical insulator comprising a member of a thermosetting resin and a platinum catalyst-containing organopolysiloxane elastomer. JP-A 198604/1984 corresponding to U.S. Pat. No. 4,476,155 proposes a one-part room temperature curable organopolysiloxane composition which is applied to the outer surface of an electrical insulator of glass or porcelain so that the electrical insulator may maintain its high insulating properties even in the presence of moisture, polluted air, ultraviolet radiation and other outdoor stresses.

JP-B 35982/1978 corresponding to U.S. Pat. No. 3,965,065 and JP-A 209655/1992 corresponding to U.S. Pat. No. 5,369,161 disclose that a silicone rubber composition with improved electrical insulation is obtained by heating a mixture of an organopolysiloxane capable of heat curing into silicone rubber and aluminum hydrate at temperatures above 100° C. for more than 30 minutes.

However, the silicone rubber compositions mentioned above are not yet fully satisfactory in high-voltage electrical insulation under rigorous conditions. Silicone rubber compositions loaded with large amounts of aluminum hydrate have a higher moisture pickup than unloaded silicone rubber since aluminum hydrate itself is hygroscopic. Thus the loaded compositions lose electrical properties in humid or wet conditions. The moisture pickup gives rise to another problem that the corona resistance required for high-voltage electrical insulators is lost. This problem cannot be solved simply by surface treating aluminum hydrate with chemical agents. There is a desire to solve this and other problems.

SUMMARY OF THE INVENTION

An object of the invention is to provide a silicone rubber composition which cures into silicone rubber having sufficiently improved properties to serve as high-voltage electrical insulators, such as weather, stain, voltage, tracking, arc and erosion resistance even under air polluted conditions or rigorous weather conditions, especially under humid conditions.

It has been found that when a mixture of at least two aluminum hydroxides each surface treated with silicon-containing compound and having different mean particle sizes, especially a mixture of a first aluminum hydroxide surface treated with a silicon-containing compound and having a mean particle size of 5 to 20 µm and a second aluminum hydroxide surface treated with a silicon-containing compound and having a mean particle size of 0.1 to 2.5 µm is blended in a silicone rubber composition comprising an organopolysiloxane of the following average compositional formula (1), finely divided silica, and an organic peroxide, the aluminum hydroxide is prevented from absorbing moisture, and the problem of corona resistance which is difficult to solve simply by surface treating aluminum hydroxide with a chemical agent can be satisfactorily solved. The resulting silicone rubber composition cures into silicone rubber which exhibits sufficiently improved high-voltage electrical insulating properties, such as weather, stain, voltage, tracking, arc and erosion resistance even when exposed under air polluted conditions or rigorous weather conditions, especially under humid conditions, for a long period of time.

The invention provides a silicone rubber composition for use as a high-voltage electrical insulator, comprising (A) 100 parts by weight of an organopolysiloxane of the following average compositional formula (1):

wherein $R^1$, which may be the same or different, is a substituted or unsubstituted monovalent hydrocarbon group and n is a positive number of 1.98 to 2.02, (B) 1 to 100 parts by weight of finely divided silica, (C) 50 to 300 parts by weight of a mixture of at least two aluminum hydroxides each surface treated with silicon-containing compound and having different mean particle sizes, and (D) 0.01 to 10 parts by weight of an organic peroxide.

DETAILED DESCRIPTION OF THE INVENTION

A first essential composition of the silicone rubber composition for use as high-voltage electrical insulators according to the invention is an organopolysiloxane of the following average compositional formula (1):

wherein $R^1$, which may be the same or different, is a substituted or unsubstituted monovalent hydrocarbon group and n is a positive number of 1.98 to 2.02.

In formula (1), $R^1$ represents substituted or unsubstituted monovalent hydrocarbon groups bonded to silicon atoms, preferably of 1 to 10 carbon atoms, more preferably 1 to 8 carbon atoms. Included are unsubstituted monovalent hydrocarbon groups, for example, alkyl groups such as methyl, ethyl, propyl, isopropyl, butyl, isobutyl, tert-butyl, hexyl, and octyl; cycloalkyl groups such as cyclohexyl; alkenyl groups such as vinyl, allyl, propenyl, isopropenyl, butenyl, and hexenyl; aryl groups such as phenyl and tolyl; and aralkyl groups such as benzyl, phenylethyl, and phenylpropyl; as well as substituted monovalent hydrocarbon groups in which some or all of the hydrogen atoms attached to carbon atoms in the foregoing groups are substituted with halogen atoms, cyano groups, etc., for example, halogen- and cyano-substituted alkyl groups such as chloromethyl, bromoethyl, trifluoropropyl, and cyanoethyl. The substituents represented by $R^1$ may be identical or different.

It is preferred that 0.001 to 5 mol %, especially 0.01 to 1 mol % of all the $R^1$ groups in a molecule is an alkenyl group. The remaining is a methyl or phenyl group. In this case, at least 95 mol %, especially at least 99 mol % of all the $R^1$ groups is preferably a methyl group.

No particular limits are imposed on the molecular structure of the organopolysiloxane of formula (1) although those blocked with triorganosilyl groups such as trimethylsilyl group, dimethylvinylsilyl group, divinylmethylsilyl group and trivinylsilyl group at the end of their molecular chain are preferred. Basically, linear organopolysiloxanes in which the main chain of the molecule consists essentially of the recurrence of diorganosiloxane units are preferable although the linear organopolysiloxanes may contain a small amount of mono-organosiloxane units and branched siloxane units such as $SiO_2$ units in a molecule, and a mixture of two or more organopolysiloxanes having different molecular structures is acceptable.

The organopolysiloxane preferably has an average degree of polymerization (or the number of silicon atoms in a molecule) of about 100 to about 100,000, especially about 4,000 to about 20,000, and a viscosity of at least 100 centistokes at 25° C., especially 100,000 to 10,000,000 centistokes at 25° C.

A second component (B) of the silicone rubber composition is finely divided silica which is essential to produce silicone rubber having improved mechanical strength. To this end, silica should preferably have a specific surface area of at least about 50 m$^2$/g, more preferably about 50 to 500 m$^2$/g, especially about 100 to 300 m$^2$/g as measured by the BET method. When silica with a specific surface area of less than 50 m$^2$/g is used, some cured parts would have poor mechanical strength.

Examples of such reinforcing silica include fumed silica and precipitated silica, which may be surface treated to be hydrophobic with such chemical agents as organochlorosilanes, organoalkoxysilanes, organosilazanes, diorganocyclopolysiloxanes, and 1,3-disiloxanediol.

Finely divided silica is blended in an amount of about 1 to about 100 parts, preferably about 30 to about 50 parts by weight per 100 parts by weight of organopolysiloxane (A). On this basis, less than 1 part of silica would be too small to achieve reinforcement whereas more than 100 parts of silica would interfere with working of the composition and reduce the mechanical strength of silicone rubber.

According to the invention, a mixture of at least two aluminum hydroxides each surface treated with a silicon-containing compound and having different mean particle sizes is blended as component (C). The aluminum hydroxide used herein is generally represented by the compositional formula:

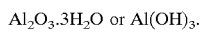

$Al_2O_3 \cdot 3H_2O$ or $Al(OH)_3$.

Blending a mixture of at least two surface-treated aluminum hydroxides having different mean particle sizes is effective for improving the corona resistance, and hence, the arc and tracking resistance of silicone rubber. In this sense, component (C) is essential for the inventive composition.

The surface treatment of aluminum hydroxide with a silicon-containing compound is necessary for endowing hydrophobic properties to aluminum hydroxide. The surface treatment method is not critical and any conventional method may be used.

Examples of the silicon-containing compound used in surface treatment include silane coupling agents, for example, organoalkoxysilanes such as methyltrialkoxysilanes, ethyltrialkoxysilanes, phenyltrialkoxysilanes, and vinyltrialkoxysilanes; silazane coupling agents, for example, hexaorganodisilazanes such as hexamethyldisilazane, tetramethyldivinyldisilazane, tetravinyldimethyldisilazane and hexavinyldisilazane, and octaorganotrisilazanes such as octamethyltrisilazane and hexamethyldivinyltrisilazane, and dimethylpolysiloxane fluid. Preferred are those surface treating agents capable of imparting vinyl groups to the surface of aluminum hydroxide. The presence of vinyl groups on the surface of aluminum hydroxide is effective for improving not only corona resistance, but also the properties necessary as polymeric insulators such as power arc properties, water resistance and electrical properties. An appropriate amount of vinyl groups affixed is at least $1.0 \times 10^{-6}$ mol, preferably $1.0 \times 10^{-6}$ to $1.0 \times 10^{-2}$ mol, more preferably $1.0 \times 10^{-5}$ to $1.0 \times 10^{-3}$ mol, per gram of aluminum hydroxide.

The preferred component (C) is a mixture of a first aluminum hydroxide surface treated with a silicon-containing compound and having a mean particle size of 5 to 20 μm, especially 8 to 15 μm and a second aluminum hydroxide surface treated with a silicon-containing compound and having a mean particle size of 0.1 to 2.5 μm, especially 0.5 to 1.5 μm. If the first aluminum hydroxide has a mean particle size in excess of 20 μm, the cured silicone rubber would be drastically reduced in mechanical strength. If the first aluminum hydroxide has a mean particle size of less than 5 μm, a mixture of aluminum hydroxides having different particle sizes would become less effective in improving the corona resistance of cured products. If the second aluminum hydroxide has a mean particle size in excess of 2.5 μm, a mixture of aluminum hydroxides having different particle sizes would become less effective in improving the corona resistance. If the second aluminum hydroxide has a mean particle size of less than 0.1 μm, it would interfere with working of the composition and reduce the mechanical strength of silicone rubber. The mean particle size as used herein can be determined, for example, as the weight average (median diameter) by a particle size distribution meter using analyzing means such as the laser light diffraction method.

Preferably, the first aluminum hydroxide and the second aluminum hydroxide are mixed in a weight ratio of from 80:20 to 20:80, especially from 60:40 to 40:60. If the proportion of the first aluminum hydroxide exceeds 80% by weight, the resulting silicone rubber would have lower mechanical strength. If the proportion of the second aluminum hydroxide exceeds 80% by weight, the resulting silicone rubber would lose corona resistance.

The overall amount of component (C) blended is about 50 to about 300 parts, especially about 100 to about 200 parts by weight, per 100 parts by weight of the organopolysiloxane (A). Less than 50 parts of component (C) would result in a composition having poor arc and tracking resistance in a cured state. More than 300 parts of component (C) would be incorporated in the composition with difficulty or render the composition less workable.

Component (D) is an organic peroxide which may be selected from well known ones. Examples include benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, t-butyl perbenzoate, 1,1-bis(t-butylperoxy)-3,3,5-trimethylcyclohexane, and 1,6-bis(t-butylperoxycarboxy)hexane.

The amount of the organic peroxide blended is about 0.01 to about 10 parts by weight per 100 parts by weight of the organopolysiloxane (A) or preferably 0.01 to 3% by weight in the silicone rubber composition.

In addition to the above essential components, optional components may be added to the silicone rubber composition. For example, extending fillers such as ground quartz, diatomaceous earth and calcium carbonate may be added insofar as the objects of the invention are not impaired.

Also, various additives such as flame retardants, fire resistance modifiers, sensitizers, coloring agents, heat resistance modifiers, and reducing agents may be added as well as reaction controlling agents, parting agents, and filler dispersing agents. While alkoxysilanes, carbon functional silanes and low molecular weight siloxanes containing silanol groups are typically used as the filler dispersing agent, it is recommended to minimize the amount of this agent so as not to compromise the effect of the invention.

In a preferred embodiment, the silicone rubber composition is free of platinum catalyst.

The silicone rubber composition of the invention may be prepared by uniformly mixing the above essential and optional components in a rubber milling machine such as a twin-roll mill, Banbury mixer, dough mixer or kneader, optionally followed by heat treatment. It is acceptable to premix the organopolysiloxane (A) with the finely divided silica (B) to form a base compound and thereafter, mix the remaining components with the base compound.

The thus obtained silicone rubber composition can be molded into silicone rubber parts of the desired shape by various molding methods such as casting, press molding, and extrusion molding. Curing conditions may be appropriately selected. For example, press molding is carried out in a mold at about 120 to 220° C. for about 5 minutes to about 1 hour.

The silicone rubber composition of the invention cures into silicone rubber which maintains sufficiently improved high-voltage electrical insulating properties, such as weather, stain, voltage, tracking, arc and erosion resistance even when exposed to air polluted conditions or rigorous weather conditions, especially to high humidity conditions, for a long period of time.

EXAMPLE

Examples of the invention are given below by way of illustration and not by way of limitation. All parts are by weight.

Example 1

To 100 parts of a rubbery organopolysiloxane A consisting of 99.825 mol % of dimethylsiloxane units, 0.15 mol % of methylvinylsiloxane units, and 0.025 mol % of dimethylvinylsiloxy units and having an average degree of polymerization of about 8,000 were added 5 parts of a silanol-terminated dimethylpolysiloxane having an average degree of polymerization of 10 as a dispersant, 10 parts of fumed silica having a specific surface area of 200 $m^2/g$ (Nippon Aerosil K.K.), 110 parts of aluminum hydroxide surface treated with vinylsilane having a mean particle size of 8 $\mu$m (Hidilite H32STV by Showa Denko K.K.) and 70 parts of aluminum hydroxide surface treated with vinylsilane having a mean particle size of 1 $\mu$m (Hidilite H42STV by Showa Denko K.K.). These ingredients were milled in a pressure kneader, obtaining Compound (1).

To Compound (1) was added 1.0 part of a 40 wt % paste of fumed silica having a specific surface area of 200 $m^2/g$ (Nippon Aerosil K.K.) in 2,5-dimethyl-bis(2,5-t-butylperoxy)hexane and organopolysiloxane A. The mixture was uniformly dispersed in a twin-roll mill and press cured at 165° C. for 10 minutes, obtaining silicone rubber sheets of 2 mm and 1 mm thick.

Example 2

To 100 parts of a rubbery organopolysiloxane A consisting of 99.825 mol % of dimethylsiloxane units, 0.15 mol % of methylvinylsiloxane units, and 0.025 mol % of dimethylvinylsiloxy units and having an average degree of polymerization of about 8,000 were added 5 parts of a silanol-terminated dimethylpolysiloxane having an average degree of polymerization of 10 as a dispersant, 10 parts of fumed silica having a specific surface area of 200 $m^2/g$ (Nippon Aerosil K.K.), 90 parts of aluminum hydroxide surface treated with vinylsilane having a mean particle size of 8 $\mu$m (Hidilite H32STV by Showa Denko K.K.) and 90 parts of aluminum hydroxide surface treated with vinylsilane having a mean particle size of 1 $\mu$m (Hidilite H42STV by Showa Denko K.K.). These ingredients were milled in a pressure kneader, obtaining Compound (2).

To Compound (2) was added 1.0 part of a 40 wt % paste of fumed silica having a specific surface area of 200 $m^2/g$ (Nippon Aerosil K.K.) in 2,5-dimethyl-bis(2,5-t-butylperoxy)hexane and organopolysiloxane A. The mixture was uniformly dispersed in a twin-roll mill and press cured at 165° C. for 10 minutes, obtaining silicone rubber sheets.

Example 3

To 100 parts of a rubbery organopolysiloxane A consisting of 99.825 mol % of dimethylsiloxane units, 0.15 mol % of methylvinylsiloxane units, and 0.025 mol % of dimethylvinylsiloxy units and having an average degree of polymerization of about 8,000 were added 5 parts of a silanol-terminated dimethylpolysiloxane having an average degree of polymerization of 10 as a dispersant, 10 parts of fumed silica having a specific surface area of 200 $m^2/g$ (Nippon Aerosil K.K.), 70 parts of aluminum hydroxide surface treated with vinylsilane having a mean particle size of 8 $\mu$m (Hidilite H32STV by Showa Denko K.K.) and 110 parts of aluminum hydroxide surface treated with vinylsilane having a mean particle size of 1 $\mu$m (Hidilite H42STV by Showa Denko K.K.). These ingredients were milled in a pressure kneader, obtaining Compound (3).

To Compound (3) was added 1.0 part of a 40 wt % paste of fumed silica having a specific surface area of 200 $m^2/g$ (Nippon Aerosil K.K.) in 2,5-dimethyl-bis(2,5-t-butylperoxy)hexane and organopolysiloxane A. The mixture was uniformly dispersed in a twin-roll mill and press cured at 165° C. for 10 minutes, obtaining silicone rubber sheets.

Comparative Example 1

To 100 parts of a rubbery organopolysiloxane A consisting of 99.825 mol % of dimethylsiloxane units, 0.15 mol % of methylvinylsiloxane units, and 0.025 mol % of dimethylvinylsiloxy units and having an average degree of polymerization of about 8,000 were added 5 parts of a silanol-terminated dimethylpolysiloxane having an average degree of polymerization of 10 as a dispersant, 10 parts of fumed silica having a specific surface area of 200 $m^2/g$ (Nippon Aerosil K.K.), 110 parts of aluminum hydroxide having a mean particle size of 8 $\mu$m (Hidilite H32M by Showa Denko K.K.) and 70 parts of aluminum hydroxide having a mean particle size of 1 $\mu$m (Hidilite H42M by Showa Denko K.K.). These ingredients were milled in a pressure kneader, obtaining Compound (4).

To Compound (4) was added 1.0 part of a 40 wt % paste of fumed silica having a specific surface area of 200 $m^2/g$ (Nippon Aerosil K.K.) in 2,5-dimethyl-bis(2,5-t-butylperoxy)hexane and organopolysiloxane A. The mixture was uniformly dispersed in a twin-roll mill and press cured at 165° C. for 10 minutes, obtaining silicone rubber sheets.

Comparative Example 2

To 100 parts of a rubbery organopolysiloxane A consisting of 99.825 mol % of dimethylsiloxane units, 0.15 mol % of methylvinylsiloxane units, and 0.025 mol % of dimethylvinylsiloxy units and having an average degree of polymerization of about 8,000 were added 5 parts of a silanol-terminated dimethylpolysiloxane having an average degree of polymerization of 10 as a dispersant, 10 parts of fumed silica having a specific surface area of 200 $m^2/g$ (Nippon Aerosil K.K.), 180 parts of aluminum hydroxide having a mean particle size of 8 $\mu$m (Hidilite H32M by Showa Denko K.K.). The resulting mixture was heat treated at 150° C. for 3 hours, obtaining Compound (5).

To Compound (5) was added 1.0 part of a 40 wt % paste of fumed silica having a specific surface area of 200 $m^2/g$ (Nippon Aerosil K.K.) in 2,5-dimethyl-bis(2,5-t-butylperoxy)hexane and organopolysiloxane A. The mixture was uniformly dispersed in a twin-roll mill and press cured at 165° C. for 10 minutes, obtaining silicone rubber sheets.

Comparative Example 3

To 100 parts of a rubbery organopolysiloxane A consisting of 99.825 mol % of dimethylsiloxane units, 0.15 mol % of methylvinylsiloxane units, and 0.025 mol % of dimethylvinylsiloxy units and having an average degree of polymerization of about 8,000 were added 5 parts of a silanol-terminated dimethylpolysiloxane having an average degree of polymerization of 10 as a dispersant, 10 parts of fumed silica having a specific surface area of 200 $m^2/g$ (Nippon Aerosil K.K.), 180 parts of aluminum hydroxide surface treated with vinylsilane having a mean particle size of 1 $\mu$m (Hidilite H42STV by Showa Denko K.K.), and 5 parts of methyltrimethoxysilane. The resulting mixture was heated treated at 150° C. for 3 hours, obtaining Compound (6).

To Compound (6) was added 1.0 part of a 40 wt % paste of fumed silica having a specific surface area of 200 $m^2/g$ (Nippon Aerosil K.K.) in 2,5-dimethyl-bis(2,5-t-butylperoxy)hexane and organopolysiloxane A. The mixture was uniformly dispersed in a twin-roll mill and press cured at 165° C. for 10 minutes, obtaining silicone rubber sheets.

The silicone rubber sheets obtained in Examples and Comparative Examples were examined by the following tests. Rubber physical properties:

The rubber sheet was measured for physical properties, hardness, tensile strength and elongation according to JIS K6301.

Weight change:

A specimen of 80 mm×80 mm was cut from the sheet of 2 mm thick and its initial weight was measured. The specimen was immersed in deionized water at 25° C. for 100 hours whereupon the weight was measured again. A percent weight change was calculated.

Dielectric properties:

The sheet of 1 mm thick was measured for initial volume resistivity, dielectric constant, dielectric loss, and dielectric breakdown voltage according to JIS K6911. After the sheet was immersed in deionized water at 25° C. for 100 hours, the same properties were measured.

The same sheet as above was immersed in a 1N nitric acid aqueous solution at 25° C. for 96 hours and then immersed in deionized water at 25° C. for 24 hours whereupon the sheet was measured again for weight and physical properties.

The results are shown in Table 1.

TABLE 1

| | | E1 | E2 | E3 | CE1 | CE2 | CE3 |
|---|---|---|---|---|---|---|---|
| Initial physical properties | Hardness (JIS-A) | 70 | 72 | 70 | 65 | 72 | 73 |
| | Tensile strength (kgf/cm$^2$) | 30 | 40 | 38 | 30 | 35 | 33 |
| | Elongation (%) | 350 | 250 | 290 | 360 | 250 | 200 |
| Initial dielectric properties | Volume resistivity ($\Omega$-cm) | 8.5 × $10^{14}$ | 3.2 × $10^{14}$ | 3.8 × $10^{14}$ | 3.2 × $10^{14}$ | 5.1 × $10^{14}$ | 5.1 × $10^{14}$ |
| | Dielectric breakdown voltage (kV/mm) | 30 | 32 | 29 | 29 | 33 | 30 |
| | Dielectric constant @ 60 Hz | 3.8 | 3.6 | 3.8 | 4.2 | 3.9 | 3.7 |
| | Dielectric loss @ 60 Hz | 0.0380 | 0.0372 | 0.0435 | 0.0410 | 0.0381 | 0.0379 |
| Weight change after water immersion (%) | | +0.28 | +0.30 | +0.25 | +0.88 | +0.91 | +0.25 |
| Dielectric properties after water immersion | Volume resistivity ($\Omega$-cm) | 8.3 × $10^{14}$ | 5.2 × $10^{14}$ | 4.2 × $10^{14}$ | 2.1 × $10^{9}$ | 7.2 × $10^{8}$ | 3.5 × $10^{14}$ |
| | Dielectric breakdown voltage (kV/mm) | 29 | 30 | 29 | 15 | 11 | 28 |
| | Dielectric constant @ 60 Hz | 3.9 | 3.8 | 3.7 | 9.8 | 8.5 | 3.7 |
| | Dielectric loss @ 60 Hz | 0.0562 | 0.0402 | 0.0430 | 0.095 | 0.089 | 0.0498 |
| Weight change after 1N HNO$_3$ and water immersion (%) | | −4.5 | −5.1 | −6.3 | −8.6 | −9.1 | −7.8 |
| Physical properties after 1N HNO$_3$ and water immersion | Hardness (JIS-A) | 49 | 50 | 51 | 20 | 16 | 16 |
| | Tensile strength (kgf/cm$^2$) | 18 | 17 | 18 | 7 | 7 | 8 |
| | Elongation (%) | 380 | 200 | 230 | 200 | 190 | 210 |

As seen from Table 1, the silicone rubber compositions within the scope of the invention (Examples 1 to 3) produce silicone rubber sheets which have minimized water pickup and excellent properties as high-voltage electric insulators even when exposed to highly humid conditions.

Japanese Patent Application No. 153740/1998 is incorporated herein by reference.

Reasonable modifications and variations are possible from the foregoing disclosure without departing from either the spirit or scope of the present invention as defined by the claims.

What is claimed is:

1. A silicone rubber composition for use as a high-voltage electrical insulator, comprising
   (A) 100 parts by weight of an organopolysiloxane of the following average compositional formula (1):

   (1)

wherein $R^1$, which may be the same or different, is a substituted or unsubstituted monovalent hydrocarbon group and n is a positive number of 1.98 to 2.02,
   (B) 1 to 100 parts by weight of finely divided silica,
   (C) 50 to 300 parts by weight of a mixture of at least a first aluminum hydroxide surface treated with a silicon-containing compound and having a mean particle size of 5 to 20 μm and a second aluminum hydroxide surface treated with a silicon-containing compound and having a mean particle size of 0.1 to 2.5 μm, and
   (D) 0.01 to 10 parts by weight of an organic peroxide.

2. The silicone rubber composition of claim 1 wherein the first aluminum hydroxide and the second aluminum hydroxide are mixed in a weight ratio of from 80:20 to 20:80.

3. The silicone rubber composition of claim 1 which is free of platinum catalyst.

4. The silicone rubber composition of claim 1 wherein at least 0.001 to 5 mol-% of the $R^1$ groups are alkenyl groups and at least 95 mol-% of the $R^1$ groups are methyl groups.

5. The silicone rubber composition of claim 1 wherein the organopolysiloxane has an average degree of polymerization of about 100 to about 100,000 and a viscosity of at least 100 centistokes at 25° C.

6. The silicone rubber composition of claim 1 wherein the silica has a specific surface area of at least about 50 m²/gram.

7. The silicone rubber composition of claim 1, comprising about 30 to about 50 parts by weight of the silica per 100 parts by weight of the organopolysiloxane.

8. The silicone rubber composition of claim 1 wherein the first aluminum hydroxide has a mean particle size of 8 to 15 μm and the second aluminum hydroxide has a mean particle size of 0.5 to 1.5 μm.

9. The silicone rubber composition of claim 1 wherein the first aluminum hydroxide and the second aluminum hydroxide are mixed in a weight ratio of from 60:40 to 40:60.

10. The silicone rubber composition of claim 1, comprising about 100 to about 200 parts by weight of the overall amount of component (C) per 100 parts by weight of the organopolysiloxane.

11. The silicone rubber composition of claim 1, wherein the organic peroxide comprises 0.01 to 3 percent by weight of the silicone rubber composition.

* * * * *